CR T 861,038

T861,038

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED APRIL 22, 1969

861 O.G. 1019

T861,038

563,097

PHOTOTROPIC ANTHRAQUINONE CONTAINING COMPOSITIONS

Gordon C. Newland and William H. Moore, both of P.O. Box 511, Kingsport, Tenn. 37662

Filed July 6, 1966. Published Apr. 22, 1969
**Int. Cl. G03c *1/72;* G02b *5/20***
U.S. Cl. 252—300
No Drawing. 10 Pages Specification

Phototropic compositions comprising a thermoplastic resin such as a polyolefin, a polyvinyl halide or acetal, a polyacrylic resin, a cellulose ester or poly(vinyl ester), a polyester, or a polycarbonate containing about 0.001 to about 10 weight percent (preferably below about 5 weight percent) of certain selected anthraquinones, for example, anthraquinone, 1,5 - diphenoxyanthraquinone, 1,6 - diphenoxyanthraquinone and 1,5 - bis - (p - methoxyphenoxy)-anthraquinone.

T861038